United States Patent [19]
Freiler

[11] Patent Number: 5,203,372
[45] Date of Patent: Apr. 20, 1993

[54] JET-FLOW PRESSURE RELIEF VENT

[75] Inventor: John L. Freiler, New Brunswick, N.J.

[73] Assignee: Girard Equipment Inc., Rahway, N.J.

[21] Appl. No.: 886,363

[22] Filed: May 21, 1992

Related U.S. Application Data

[63] Continuation-in-part of Ser. No. 789,593, Nov. 8, 1991, abandoned.

[51] Int. Cl.$^5$ ............................................. F16K 17/196
[52] U.S. Cl. ..................................................... 137/469
[58] Field of Search .......................... 137/469, 476, 478

[56] References Cited

U.S. PATENT DOCUMENTS

| | | | |
|---|---|---|---|
| 1,200,875 | 10/1916 | Roy | 137/478 |
| 1,233,752 | 7/1917 | Clark | 137/478 |
| 4,799,506 | 1/1989 | Taylor | 137/469 |
| 4,823,828 | 4/1989 | McGinnis | 137/469 |
| 4,932,434 | 6/1990 | Taylor | 137/469 |

*Primary Examiner*—Stephen M. Hepperle
*Attorney, Agent, or Firm*—R. Gale Rhodes, Jr.

[57] ABSTRACT

A pressure relief vent for a pressure vessel such as an over the road tank trailer including a poppet forced into sealing engagement with a valve seat by a compression spring which maintains the poppet in sealing engagement with the valve seat to a set pressure and which poppet upon the occurrence of pressurized fluid in the trailer tank sufficiently in excess of the set pressure lifts the poppet up off of the valve seat a distance sufficient to permit the over-pressurized fluid to flow out of the vent at the flow rate, the outer peripheral portion of the poppet is provided with outwardly curved and downwardly extending portions which form the escaping over-pressurized fluid into a jet stream which provides reaction force which assists the pressurized fluid in maintaining the poppet lifted off of the valve seat to provide the flow rate and which permits the use of a stiffer and therefore shorter compression spring enabling the pressure relief vent to be shorter in height while maintaining the required flow rate.

1 Claim, 4 Drawing Sheets

JET-FLOW PRESSURE RELIEF VENT

CROSS-REFERENCE TO RELATED APPLICATIONS

This application is a continuation-in-part of U. S. Patent application Ser. No. 789,593, filed Nov. 8, 1991, now abandoned, John L. Freiler inventor, assigned to the same assignee as this application.

BACKGROUND OF THE INVENTION

This invention relates generally to a pressure relief vent for a pressure vessel for containing a pressurized fluid and more particularly this invention relates to a new and improved jet-flow pressure relief vent particularly useful for relieving or venting an over-pressurized pressure vessel such as an over the road tank trailer.

As known to those skilled in the art, an over the road tank is a mobile pressure vessel typically pulled behind a truck or tractor and which tank is for containing a fluid, gas or liquid, during transportation from one point to another. Such contained fluids can be pressurized fluids or unpressurized fluids, however, the un-pressurized fluids may become pressurized due to heating of the tank by the sun which in turn heats the fluid contained in the tank causing it to be pressurized. Also, during an emergency situation, such as upon the over the road tank becoming heated in a fire, the fluid contained in the tank can become heated and pressurized.

As further known to those skilled in the art, over the road tanks are not formed in one piece but instead are typically formed from a plurality of individual pieces of metal welded together into the shape of an over the road tank. The manufacturer of the over the road tank manufactures the tank to what is known in the art as a working pressure which is determined by the thickness of the tank material, the strength of the welds, etc. Typically an appropriate safety factor is provided for the working pressure.

As is still further known to those skilled in the art, the Department of Transportation of the United States Government (DOT) promulgates regulations controlling over the road tanks. More specifically, the DOT promulgates regulations concerning the relieving or venting of the tank in the event of over pressurization of the contained fluid to prevent tank rupture and injury to persons and property. Such DOT regulations include a set pressure which is a pressure at which the pressure relief vent must begin venting the tank to relieve over-pressurization; such set pressure is related or proportional to the tank working pressure. As is still further known, the DOT also promulgates regulations concerning the rate at which the pressure relief vent must allow the over-pressurized fluid to flow out of the pressure relief vent at a pressure known as the flow pressure; this rate is called the flow rate and the flow pressure is a pressure greater than the set pressure by a predetermined amount.

The typical prior art pressure relief vent for an over the road tank trailer includes a housing mounted on the top of the tank trailer and which housing provides a valve seat at its top which is normally engaged by a poppet forced into sealing engagement with the valve seat by a compression spring mounted in the housing and providing downwardly acting force on the poppet; the underside of the poppet is exposed to the pressurized fluid in the tank through the housing and the pressurized fluid in the tank provides an upwardly acting force on the underside of the poppet. As is still further known to those skilled in the art, the compression spring is and preloaded such that the downwardly acting force provided by the spring on the poppet is sufficient to maintain the poppet in sealing engagement with the valve seat up to the set pressure in opposition to any upwardly acting force applied to the underside of the poppet by the pressurized fluid. As is still further known, the compression spring must be chosen such that upon the fluid in the over the road tank trailer becoming over-pressurized to the flow pressure the compression spring will compress sufficiently upwardly to permit the poppet to be lifted up off of the valve seat by the force created by the over-pressurized fluid a distance sufficient to provide a space or opening, typically an annular space or opening, between the valve seat and the poppet sufficiently large to permit the over-pressurized fluid to flow or escape therethrough as a stream, or streams, of over-pressurized fluid and at the required flow rate.

As is still further known, compression springs are characterized by what is known as a spring constant which is the relationship between the distance the spring will compress upon the application thereto of a given force. Accordingly, as is still further known, the spring constant for the compression spring of a pressure relief vent is the difference between the flow pressure and the set pressure in pounds per square inch times the area of the poppet in square inches, divided by the distance in inches between the valve seat and the poppet required to provide the above-noted flow rate. A general characteristic of compression springs, as is known, is that the higher the spring constant the stiffer the spring.

As is still further known, the DOT requires that the pressure relief vent for an over the road tank trailer be mounted on the tank trailer as close as possible to the top center of the tank trailer so that the pressure relief vent is exposed to the vapor space inside the tank trailer, with such vapor space, as is known, being the space between the fluid contained in the tank trailer and the top of the tank trailer. As is further known the height of the pressure relief vent is determined largely by the height or length of the compression spring.

Since the pressure relief vent must be mounted on the top center of the over the road tank trailer, it is obviously desirable, if not virtually required, that the height of the pressure relief vent be as small as-possible to permit the over the road tank trailer with the pressure relief vent mounted on top to safely pass under overhead structures such as bridges and the like with adequate clearance while maintaining the required flow rate. This means that the length or height of the compression spring of the pressure relief vent must be as small as possible and yet the compression spring, as noted above, must be sufficiently stiff to maintain the poppet in sealing engagement with the valve seat at the set pressure and which spring must be sufficiently unstiff that it will compress sufficiently at the flow pressure to permit the poppet to be moved away from the valve seat a distance sufficient to provide the above-noted flow rate. Obviously, as known to those skilled in the art, these two spring requirements are in conflict with each other because, generally speaking and as is further known, the higher or longer the compression spring the lower the spring constant and the shorter the spring the higher the spring constant.

Numerous pressure relief vents are known to the prior art for relieving an over-pressurized pressure vessel such as the above-noted over the road tank trailer. Generally, the typical poppet of the prior art pressure relief vent is flat and has a flat underside against which the pressure in the pressure vessel, such as an over the road tank trailer, acts to apply or develop a force which lifts the poppet off of the valve seat. In these prior art pressure relief vents, the pressure acting against the underside of the poppet typically acts only against a flat poppet underside. However, other prior art pressure relief vents are known to the art wherein the poppet is provided with a shape other than flat, or at least other than flat at its outer peripheral underside portion,.which causes the vented or escaping over-pressurized fluid to develop an additional upwardly acting force for assisting the force applied to the central underside portion of the poppet by the over-pressurized fluid in lifting the poppet .off of the valve seat. Such assistance permits the use of a stiffer and therefore shorter in length compression spring for performing both the foregoing functions of sealing the poppet to the valve seat to the set pressure and compressing sufficiently to provide the flow rate at the flow pressure; such shorter in length compression spring permits the pressure relief vent to be shorter in height. An example of such prior art pressure relief vent is shown in FIG. 1.

The prior art pressure relief vent shown in FIG. 1 is identified by general numerical designation 10 and includes a housing 12 including an upper housing member 11 mounted threadedly to a lower housing member 13 in turn mounted threadedly to the top of a pressure vessel such as an over the road tank trailer 14. A compression spring, or more particularly a plurality of concentric compression springs 16 and 18, are mounted in the housing 12 and apply downwardly acting force indicated by arrows 19 and 20 which act against the top of a poppet 22 to maintain the poppet in sealing engagement with the valve seat 24 up to the set pressure. Upon occurrence of over-pressure in the tank trailer 14 greater than the set pressure, such over-pressure applies or develops force indicated by arrow 26 which acts on the underside of the poppet 22 and lifts the poppet 22 upwardly off of the valve seat 24 to permit the over-pressurized fluid to escape or vent as a stream of pressurized fluid passing between the space or area between the underside of the poppet 22 and the valve seat 24 and out of the housing 12 through the vent openings 28. It will be noted from FIG. 1 that the underside of the outer peripheral portion of the poppet 22 is provided with an inwardly and upwardly inclined surface 30 against which the escaping stream of over-pressurized fluid will also act and which inclined surface 30 will provide an upwardly acting component of force which will assist the force 26 acting against the central underside portion of the poppet 22 in lifting the poppet 22 off of the valve seat 24. However, it has been found that such inclined surface 30 does not provide a sufficiently high additional force to permit the height or length of the compression springs 16 and 18 to be sufficiently small or short in length to provide a pressure relief vent 10 sufficiently short in height as is desired for mounting of the pressure relief vent 10 on the top of an over the road tank trailer.

Accordingly, there exists a need in the pressure relief vent art for a pressure relief vent which is as short in height as possible and yet which pressure relief vent also satisfies the above-noted DOT regulations. This means, generally, that the pressure relief vent must include a compression spring as short in height as possible, and yet which compression spring both maintains the poppet in engagement with the valve seat at the set pressure and which compression spring compresses sufficiently at the flow pressure to permit the poppet to move away from, or be lifted off of, the valve seat a distance sufficient to provide sufficiently large space or area between the valve seat and the poppet to permit the over-pressurized fluid to flow therethrough at a rate at least equal to the flow rate.

SUMMARY OF THE INVENTION

The object of the present invention is to satisfy the foregoing need in the pressure relief vent art.

A new and improved pressure relief vent satisfying this object and embodying the present invention includes a poppet provided with a predetermined shape for forming an escaping stream of over-pressurized fluid into a jet stream which provides a reaction force which acts against the underside of the poppet to assist the over-pressurized fluid in lifting the poppet off of the valve seat upon occurrence of over pressurization.

DESCRIPTION OF THE PREFERRED EMBODIMENT

Figure 1:
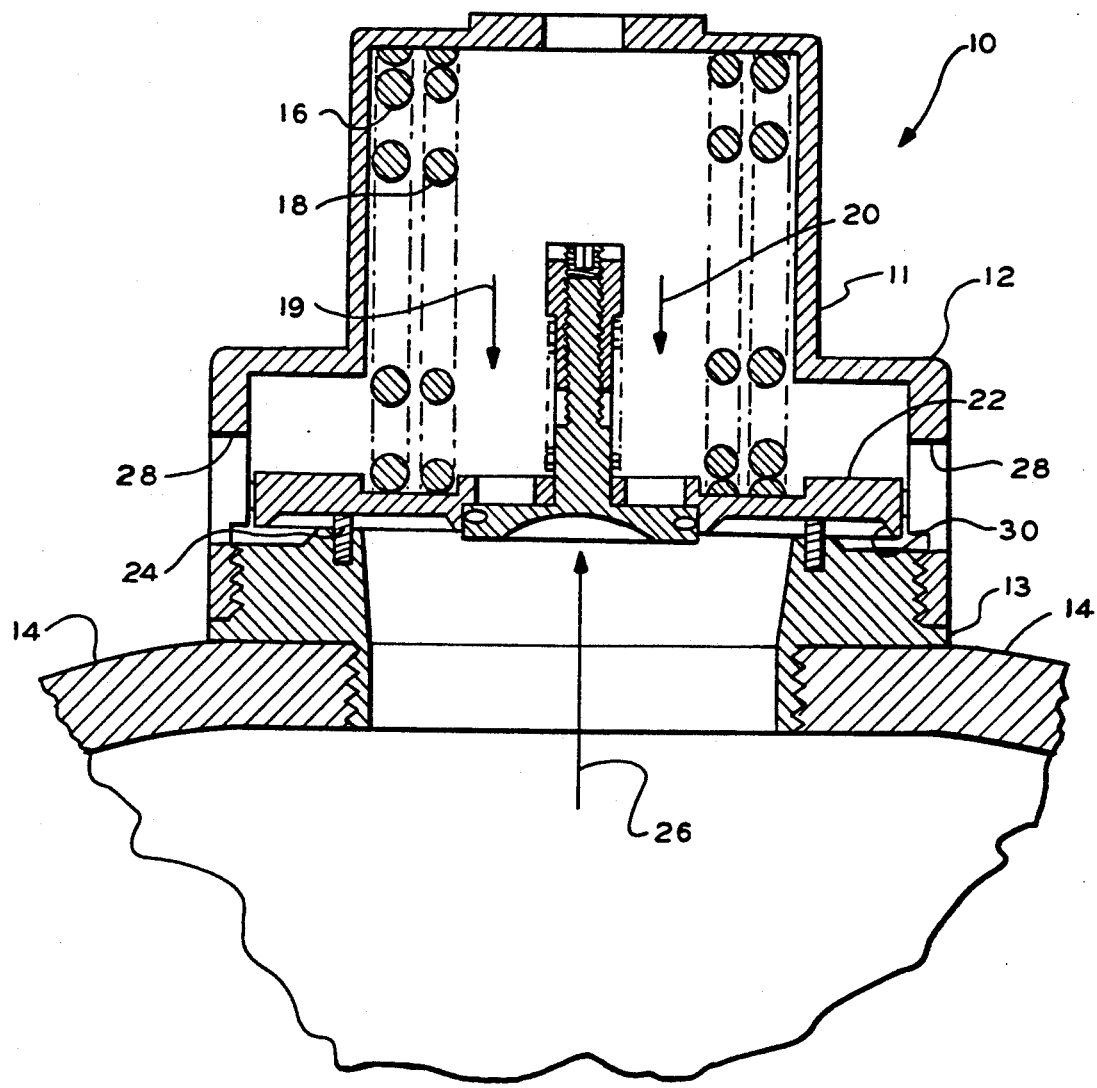
FIG. 1 is an elevational view, in cross-section, of the above-described prior art pressure relief vent.
Figure 2:
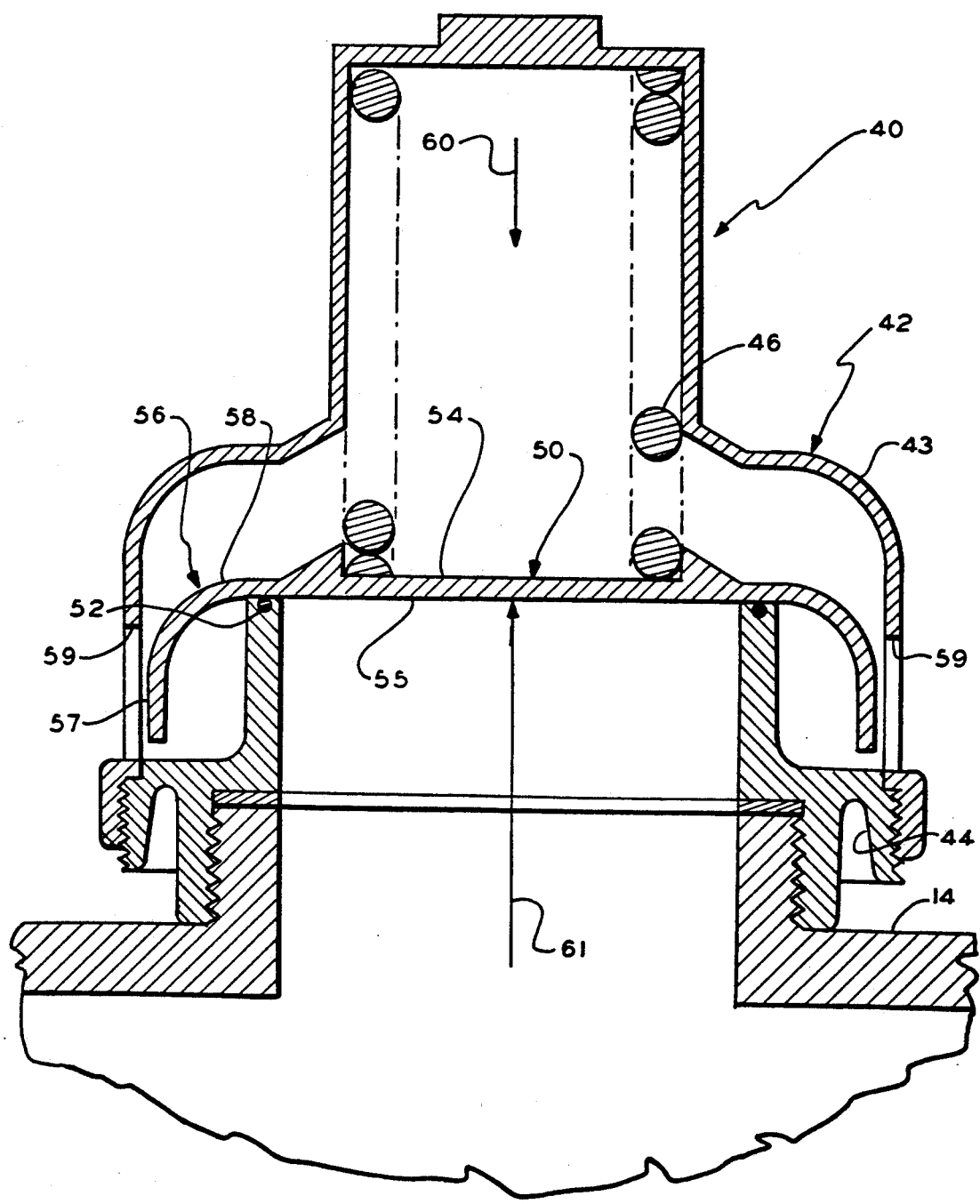
FIG. 2 is an elevational view in cross-section of the new and improved pressure jet-flow relief vent of the present invention with the pressure relief vent shown closed with the poppet shown in sealing engagement with the valve seat.
Figure 3:
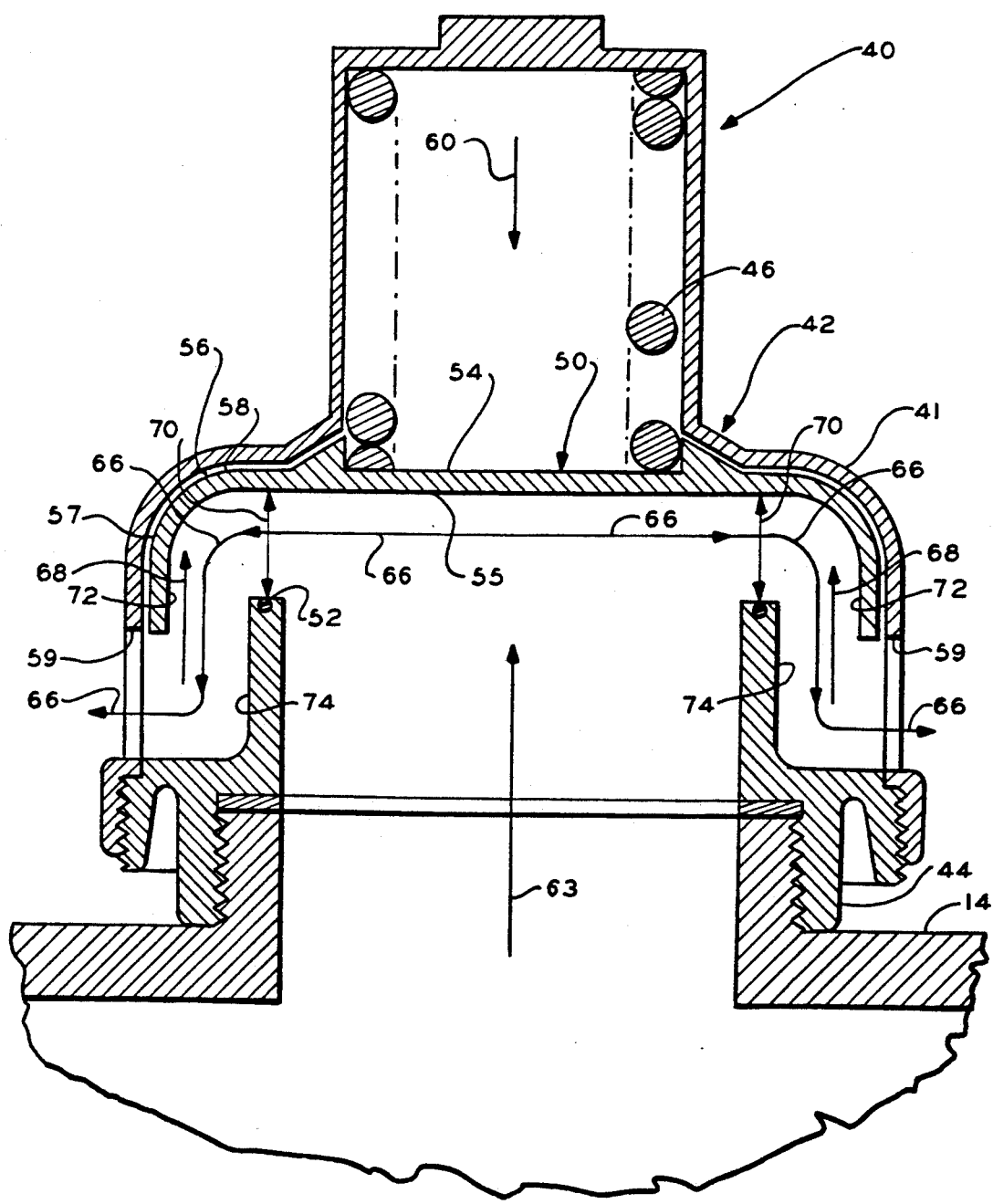
FIG. 3 is a view similar to FIG. 2 but showing the pressure relief vent of the present invention in the open position with the poppet shown lifted off of the valve seat due to over-pressurized fluid acting against the underside of the poppet.

Referring now to FIGS. 2 and 3, a new and improved jet-flow pressure relief vent embodying the present invention is illustrated diagrammatically and indicated by general numerical designation 40. The vent 40 is particularly useful for venting over-pressurized pressure vessels such as for example the over the road tank trailer 14. As noted above in the Description of the Drawings, FIGS. 2 and 3 are elevational views in cross-section, and it will be understood by those skilled in the pressure relief vent art that the elements comprising pressure relief vent 40 are, generally, circular, annular, and cylindrical in shape.

Pressure relief vent 40 includes a housing indicated by general numerical designation 42 which includes an upper housing member 43 threadedly engaged at its lower inner peripheral portion with the threaded outer peripheral portion of a lower housing member 44 which housing member 44, in turn, is threadedly engaged with an upwardly extending threaded portion of the over the road tank trailer 14. The vent 40 further includes a compression spring 46 mounted in the upper portion of the upper housing member 42 and which compression spring 46 is for exerting downwardly acting force, indicated by arrow 60, against a poppet, indicated by general numerical designation 50, and for forcing the poppet 50 into sealing engagement with a valve seat provided at the upper portion of the lower housing member 44 and which valve seat comprises a suitable O-ring 52. The upper housing member 43 is provided with openings 59 for venting over-pressurized fluid to the atmosphere.

The poppet 50 includes a circular central portion 54 providing a circular central underside portion 55 and an outer peripheral portion indicated by general numerical designation 56 including a cylindrical portion 57 extending vertically downwardly at a right angle with respect to the central portion 54 and an outwardly rounded smooth curved intermediate portion 58 intermediate and interconnecting the central portion 54 and the cylindrical portion 57.

Referring particularly to FIG. 2, it will be understood that the compression spring 46 is chosen to have a stiffness sufficient to cause the spring 46 to exert sufficient downwardly acting force 60 to maintain the poppet 50 in sealing engagement with the valve seat comprising O-ring 52 up to the set pressure of the pressure relief vent 40 and against any upwardly acting force indicated by arrow 61 which force is produced by any pressurized fluid in the tank trailer 14 pressurized not in excess of the set pressure of the vent 40.

It will now be presumed that fluid contained in the tank trailer 14 has become over-pressurized sufficiently in excess of the set pressure of the vent 40 to produce an upwardly acting force indicated by arrow 63, which force acts against the central underside portion 55 of the poppet 50 with sufficient force such that it overcomes the downwardly acting force 60 applied against the poppet 50 by the compression spring 46 to lift the poppet up off of the valve seat comprising the O-ring 52. Upon the poppet 50 being lifted up off of the valve seat, the over-pressurized fluid, indicated by arrows 66, escapes or is vented outwardly through the openings 59.

It has been discovered, FIG. 3, and in accordance with the teachings of the present invention, that by providing the outer peripheral portion 56 of the poppet 50 with the shape shown in FIGS. 2 and 3, and described above, the stream of over-pressurized fluid indicated by arrows 66 will be formed into a jet stream which flows between the inner portion 72 of poppet outer peripheral portion 56 and the outer portion 74 of the lower housing member 44, and produces reaction force indicated by arrows 68 in FIG. 3, which reaction force 68 acts against the underside of the poppet 50, particularly the underside of the outer peripheral portion 56, and assists the force indicated by arrow 63 acting against the central underside portion 55 of the poppet 50 in lifting the poppet 50 up off of the valve seat comprising 0-ring 52 a distance indicated by arrow 70 in FIG. 3 which produces an opening, an annular opening, between the valve seat comprising O-ring 52 and the underside of the poppet 50 sufficiently large to permit or provide the flow rate required by the DOT, as taught above, for venting over-pressurized fluid from the road tank trailer 14.

It will be understood by those skilled in the pressure relief vent art that the reaction force indicated by arrow 68 produced by the novel shape of the poppet 50 of the present invention, particularly outer poppet peripheral portion 56, and which reaction force 68 is additive to and assists the force indicated by arrow 63 acting against the central underside portion of poppet 50 in lifting the poppet up off of the valve seat comprising O-ring 52 the distance 70, permits the use of a stiffer, and hence shorter in height, compression spring 48 than would otherwise be required to meet the above-noted set pressure and flow rate required by the DOT, and this shorter compression spring permits the pressure relief vent 40 to be shorter in height.

Figure 4:
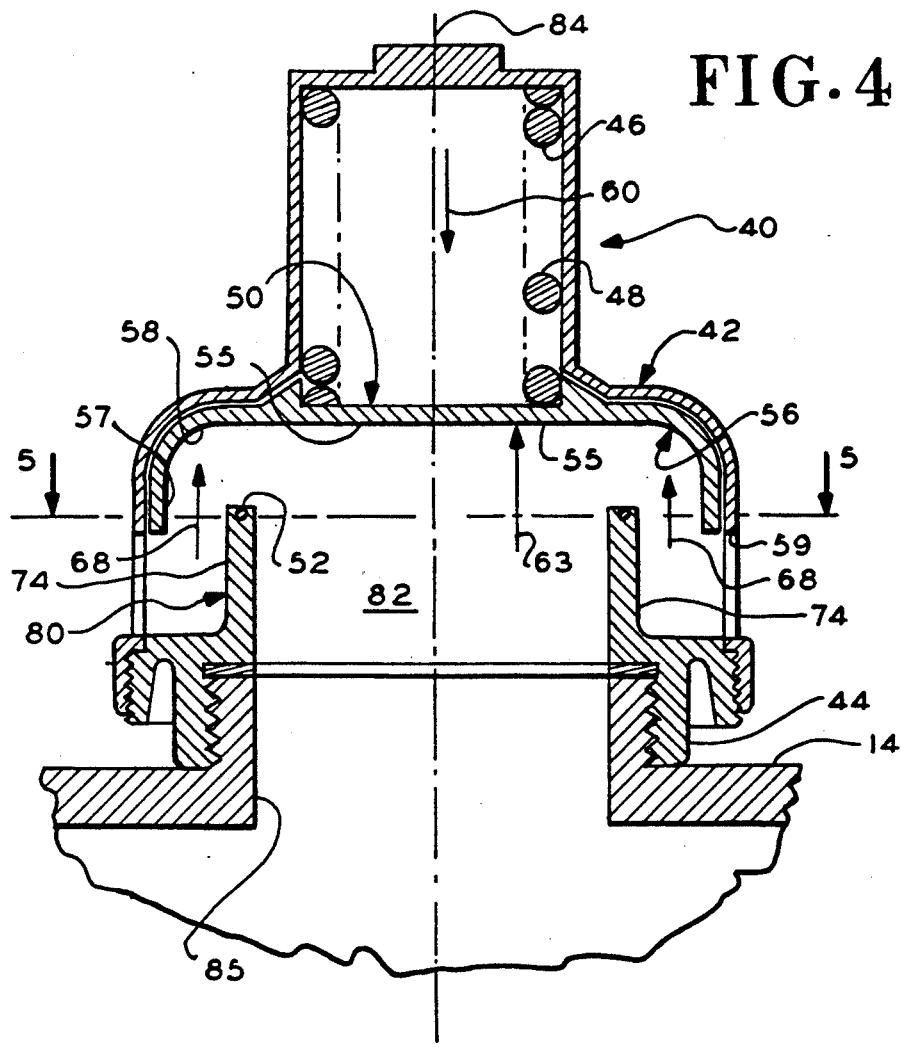
FIG. 4 is FIG. 3 reduced in size with certain of the reference numerals in FIG. 3 not being shown for clarity.
Figure 5:
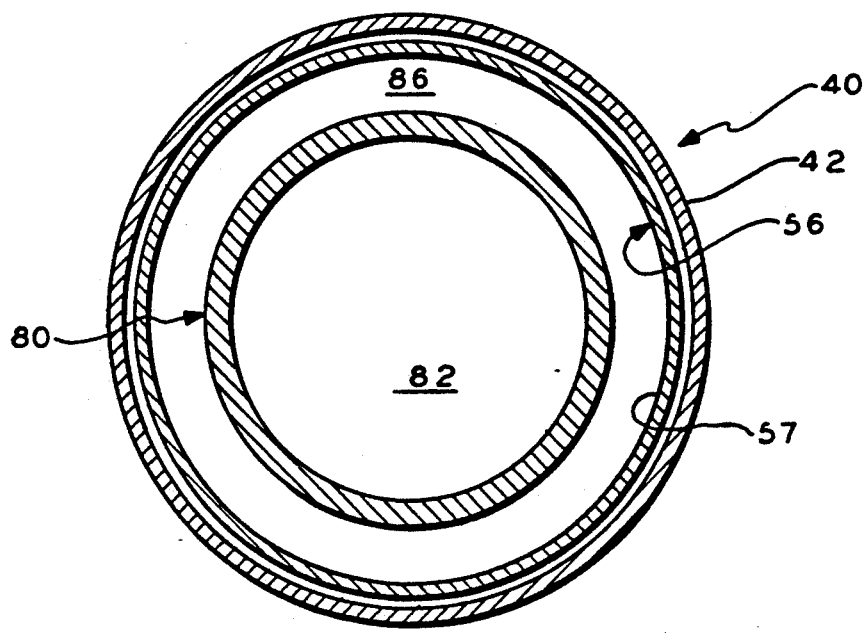
FIG. 5 is a transverse cross-sectional view taken along the line 5—5 in FIG. 4 in the direction of the arrows.

A further feature or aspect of the present invention may be understood by reference to FIGS. 4 and 5. From FIGS. 4 and 5 it will be understood that the lower housing member 44 includes a generally centrally disposed outwardly or upwardly extending cylindrical member indicated by numerical designation 80. Cylindrical member 80 is provided with an internal cylindrical passageway 82 which, as may be better understood by reference to FIG. 5, is circular in transverse cross-section, that is appears circular when viewed in a plane perpendicular to the axis 84 (FIG. 4) of the pressure relief vent 40. As may be noted from FIG. 4, the cylindrical passageway 82 is in fluid communication with the opening 85 formed in the pressure vessel 14, and as may be noted by again referring to FIG. 2, the cylindrical portion 57 of the outer peripheral portion 56 of the poppet 50 generally surrounds the cylindrical member 80 and is spaced radially outwardly therefrom to provide therebetween, upon said poppet being lifted off of said valve seat 52 as shown in FIG. 3, an annular passageway 86 which, as may be better understood by reference to FIG. 5, is annular in transverse cross-section, that is annular when viewed in a plane perpendicular to the axis 84 of the pressure relief vent 40.

Referring again to FIGS. 4 and 5, it will again be presumed that the fluid contained in the over the road tank trailer 14 has become over-pressurized, i.e. has become pressurized in excess of the set or predetermined relief pressure of the vent 40, and that such over-pressurized fluid is producing force, indicated by arrows 63 in FIG. 4, acting upwardly against the central underside portion 55 of the poppet 50 with sufficient force to overcome the downwardly acting force 60 applied against the top of the poppet 50 by the compression spring 56 and to lift the poppet 50 up off of the valve seat comprising the O-ring 52 (FIG. 3). This permits the over-pressurized fluid to pass through the cylindrical passageway 82, FIGS. 4 and 5, through the annular passageway 86 (FIG. 5) and out the vent opening 59 (FIG. 4).

It will be particularly noted by reference to FIGS. 4 and 5, that upon the poppet 50 being lifted off of the valve seat 52 the cylindrical portion 57 of the peripheral portion 56 of the poppet 50 and the outer portion 74 of the cylindrical member 80 provide the annular passageway 86 with a substantially constant or uniform transverse cross-section and a substantially constant or uniform transverse cross-sectional area. It will be further particularly understood from FIG. 5, and the following teaching of the present invention, that the annular transverse cross-sectional area of the annular passageway. 86 and the circular transverse cross-sectional area of the passageway 82 are substantially equal in area. It has been discovered that by providing the annular passageway 86 with a substantially constant transverse cross-sectional area and that by making the transverse cross-sectional areas of the annular passageway and cylindrical passageway 82 equal, this combination forms the over-pressurized stream of fluid being vented into a jet-stream which acts against the underside of the outwardly rounded smooth curved intermediate portion 58 of the peripheral portion 56 of the poppet 50 to provide reaction force, reaction force being indicated in FIG. 4 by the arrows 68, which acts against the underside of the poppet 50 and assists the over-pressurized fluid indicated by arrows 63 in FIG. 4 in lifting the poppet 50 off of the valve seat 52. This assistance, as taught above, permits the use of a stiffer, and hence shorter in height compression spring 48, than would otherwise be required to meet the above-noted set pressure and flow rate required by the DOT and, as also taught above, such shorter compression spring permits the pressure relief vent 40 to be shorter in height.

It will be understood that many variations and modifications may be made in the present invention without departing from the spirit and the scope thereof.

What is claimed is:

1. A pressure relief vent for allowing pressurized fluid pressurized over a predetermined pressure level to be vented from a pressure vessel as a stream of over-pressurized fluid, comprising:

housing means for being mounted to said pressure vessel around an opening formed therein, said housing means including a generally centrally disposed outwardly extending cylindrical member provided with an internal cylindrical passageway which is circular in transverse cross-section and which has a circular transverse cross-sectional area, said cylindrical passageway for being placed in fluid communication with said opening formed in said pressure vessel, said cylindrical member including a top portion provided with a valve seat, and said housing means provided with at least one vent opening for venting said stream of over-pressurized fluid;

a poppet and a compression spring mounted in said housing, said poppet including a central portion for overlying said cylindrical passageway provided in said cylindrical member and said spring for normally forcing said central portion of said poppet into sealing engagement with said valve seat to prevent venting of pressurized fluid contained in said pressure vessel pressurized below said predetermined pressure level, said poppet further including an outer peripheral portion including a cylindrical portion extending outwardly generally at a right angle with respect to said central portion and an outwardly rounded smooth curved intermediate portion interconnecting said central portion and said cylindrical portion of said poppet, said cylindrical portion of said peripheral portion of said poppet generally surrounding said cylindrical member and being spaced outwardly from said cylindrical member to provide therebetween an annular passageway upon said poppet being lifted off of said valve seat, said annular passageway being annular in transverse cross-section and having an annular transverse cross-sectional area;

upon pressurized fluid contained in said pressure vessel being pressurized above said predetermined pressure level, said pressurized fluid acting against said central portion of said poppet to lift said poppet off of said valve seat to permit said pressurized fluid pressurized above said predetermined pressure level to be vented as said stream of over-pressurized fluid by passing through said cylindrical passageway provided in said cylindrical member, through said annular passageway formed between said cylindrical portion of said peripheral portion of said poppet and said cylindrical member and out of said housing through said vent opening; and upon said poppet being lifted off of said valve seat, said cylindrical portion of said peripheral portion of said poppet and said cylindrical member providing said annular passageway with a substantially constant annular transverse cross-sectional area, and said circular transverse cross-sectional area of said cylindrical passageway provided in said cylindrical member and said annular transverse cross-sectional area of said annular passageway provided between said cylindrical portion of said peripheral portion of said poppet and said cylindrical member being substantially equal, and said substantially constant transverse cross-sectional area of said annular passageway and said substantially equal transverse cross-sectional areas of said cylindrical and annular passageways cooperating to form said stream of overpressurized fluid into a jet-stream acting against the underside of said outwardly rounded smooth curved intermediate portion of said peripheral portion of said poppet to provide reaction force which assists said pressurized fluid pressurized above said predetermined pressure level in lifting said central portion of said poppet off of said valve seat.

* * * * *